(12) United States Patent
Tadiello

(10) Patent No.: US 11,933,444 B2
(45) Date of Patent: Mar. 19, 2024

(54) SAFE INERTIZATION APPARATUS

(71) Applicant: L'Air Liquide, Société Anonyme pour l'Etude et l'Exploitation des Procédés Georges Claude, Paris (FR)

(72) Inventor: Jean-Philippe Tadiello, Frankfurt am Main (DE)

(73) Assignee: L'Air Liquide, Société Anonyme pour l'Etude et l'Expoitation des Procédés Georges Claude, Paris (FR)

( * ) Notice: Subject to any disclaimer, the term of this patent is extended or adjusted under 35 U.S.C. 154(b) by 485 days.

(21) Appl. No.: 17/324,551

(22) Filed: May 19, 2021

(65) Prior Publication Data

US 2021/0364115 A1 Nov. 25, 2021

(30) Foreign Application Priority Data

May 19, 2020 (EP) ..................... 20020234

(51) Int. Cl.
*F16L 55/00* (2006.01)
*A62C 2/04* (2006.01)
(Continued)

(52) U.S. Cl.
CPC ............... *F16L 55/00* (2013.01); *A62C 2/04* (2013.01); *A62C 3/065* (2013.01); *A62C 35/645* (2013.01);
(Continued)

(58) Field of Classification Search
CPC . F16L 55/00; A62C 2/04; A62C 3/065; A62C 35/645; A62C 99/0018;
(Continued)

(56) References Cited

U.S. PATENT DOCUMENTS 3,777,928 A * 12/1973 Kober ..................... B63B 57/04
48/190
5,837,192 A * 11/1998 Luerken ................... B01J 19/14
422/111
(Continued)

FOREIGN PATENT DOCUMENTS

EP 1 913 980 4/2008

OTHER PUBLICATIONS

Ajibulu, 16" UTUE PP gas pipeline nitrogen purging procedure, downloaded from https://www.slideshare.net/DermawanTarigan1/nitrogen-purging?from_action-save on Aug. 20, 2020, 17 pages.
(Continued)

*Primary Examiner* — Minh Q Le
(74) *Attorney, Agent, or Firm* — Elwood L. Haynes

(57) ABSTRACT

The invention relates to an inertization apparatus for inerting a working volume in a chemical production plant by flushing with inert gas, where the chemical production plant comprises a plant-wide inert gas distribution system having pipes for distributing the inert gas and at least one inert gas offtake position which can be connected to a connecting conduit. According to the invention, it is provided that the connecting conduit between inertization apparatus and working volume is connected, at its end nearest the working volume, in a not reversibly detachable manner to an intermediate piece, where the intermediate piece can be connected in a reversibly detachable manner to a counterpiece provided on the working volume.

11 Claims, 1 Drawing Sheet

(51) Int. Cl.
*A62C 3/06* (2006.01)
*A62C 35/64* (2006.01)
*B01J 19/00* (2006.01)
*B01J 19/14* (2006.01)
*F16K 15/00* (2006.01)
*F16K 17/02* (2006.01)
*F17D 1/04* (2006.01)
*F17D 3/01* (2006.01)
*A62C 99/00* (2010.01)

(52) U.S. Cl.
CPC ............. *B01J 19/002* (2013.01); *B01J 19/14* (2013.01); *F16K 15/00* (2013.01); *F16K 17/02* (2013.01); *F17D 1/04* (2013.01); *F17D 3/01* (2013.01); *A62C 99/0018* (2013.01); *A62C 99/0063* (2013.01); *B01J 2219/00162* (2013.01)

(58) Field of Classification Search
CPC ..... A62C 99/0063; B01J 19/002; B01J 19/14; B01J 2219/00162; F16K 15/00; F16K 17/02; F17D 1/04; F17D 3/01
USPC .......................................................... 137/154
See application file for complete search history.

(56) References Cited

U.S. PATENT DOCUMENTS

| | | | |
|---|---|---|---|
| 6,431,229 B1* | 8/2002 | Birtcher | F17C 13/04 141/67 |
| 2005/0051234 A1* | 3/2005 | Steidl | F17C 13/04 141/234 |
| 2006/0027281 A1* | 2/2006 | Silva | B08B 9/032 141/63 |
| 2008/0156505 A1* | 7/2008 | Wagner | A62C 99/0018 169/11 |
| 2011/0180151 A1* | 7/2011 | Borgel | F17D 1/14 137/14 |
| 2015/0090341 A1* | 4/2015 | Ng | H01L 21/00 137/583 |
| 2015/0314152 A1* | 11/2015 | Moses | G05D 16/2066 169/45 |
| 2017/0173373 A1 | 6/2017 | Wagner et al. | |
| 2018/0126202 A1* | 5/2018 | Vandroux | A62C 3/065 |
| 2019/0388832 A1* | 12/2019 | Rheaume | A62C 99/0018 |
| 2020/0038828 A1* | 2/2020 | Lautenschläger | B01J 3/042 |

OTHER PUBLICATIONS

Harrower, N., Leading fluid transfer specialists to the UK's Manufacturing & process industries manufacturers of flexible hoses & couplings, downloaded from http://www.lantechsolutions.co.uk/wp-content/uploads/2012/01/LANTECH8.pdf on Aug. 21, 2020, 20 pages.

Hydro Instruments, Chlorine piping and cleaning information (nitrogen purging), downloaded from http:/www.hydroinstruments.com/files/Nitrogen%20Purging.pdf on Aug. 20, 2020, 4 pages.

Kingley Jr., G.R., Properly purge and inert storage vessels, downloaded from http://lib3.dss.go.th/fulltext/Journal/Chemical%20Engineering%20Progress/no.2/2001v97n2p57-61.pdf on Aug. 20, 2020, 5 pages.

REXARC, Best practices to adopt during nitrogen purging of acetylene production plant, downloaded from https://www.rexarc.com/blog/importance-of-adopting-best-practices-during-nitrogen-purging-of-an-acetylene-production-plant on Aug. 20, 2020, 8 pages.

European Search Report for corresponding EP 20020234, dated Aug. 21, 2020.

* cited by examiner

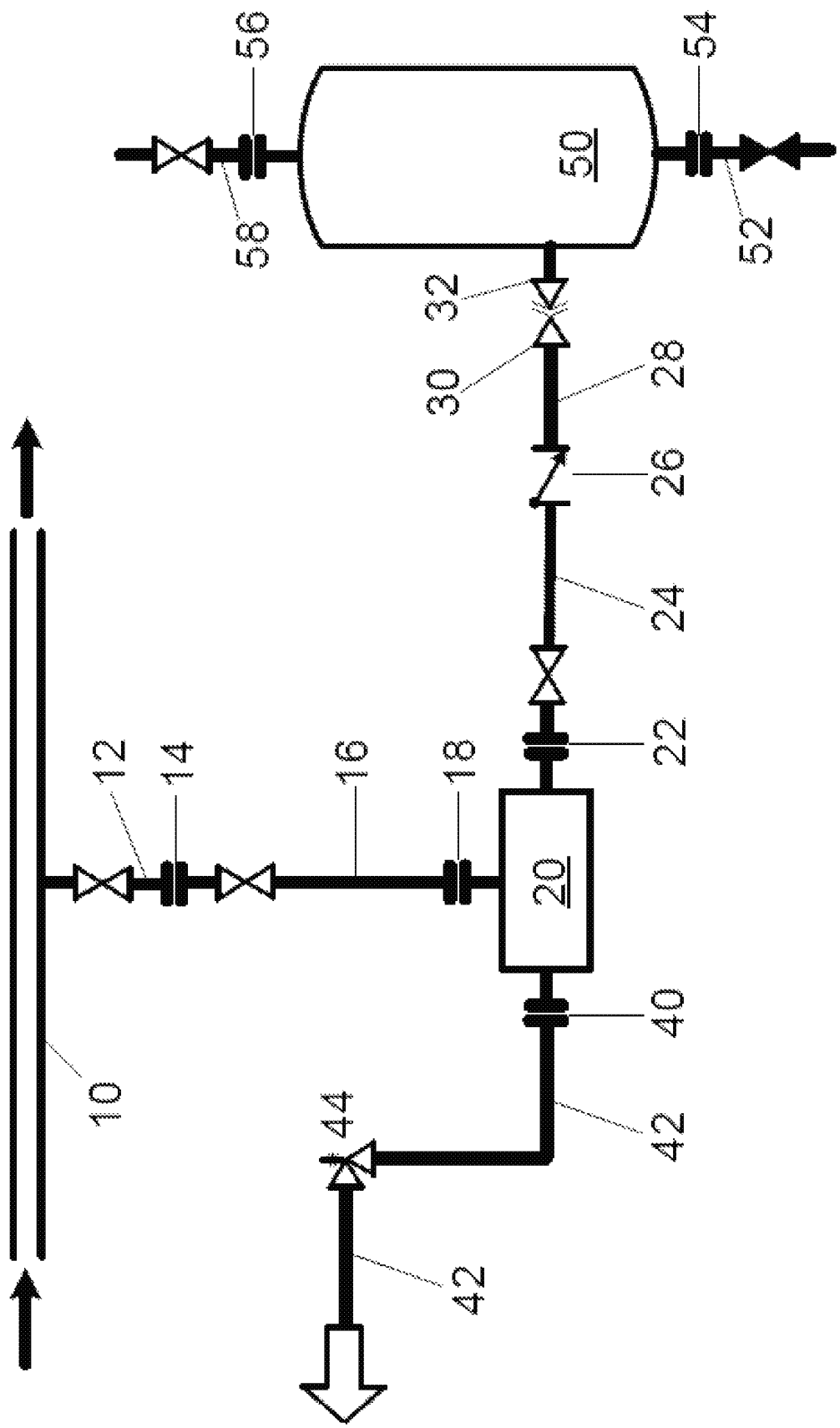

SAFE INERTIZATION APPARATUS

CROSS REFERENCE TO RELATED APPLICATIONS

This application claims the benefit of priority under 35 USC § 119(a) and (b) to EP 20020234.9, filed May 19, 2020, the entire contents of which are incorporated herein by reference.

BACKGROUND

Field of the Invention

The invention relates to a safe inertization apparatus for inerting a working volume in a chemical production plant by flushing with inert gas, where the chemical production plant comprises a plant-wide inert gas distribution system having pipes for distributing the inert gas and at least one inert gas offtake position which can be connected to a connecting conduit and to which the inertization apparatus can be connected. The invention further provides for particular uses of the inertization apparatus.

Prior Art

The expression inertization of a working volume in the chemical industry is used to refer to the introduction of inert substances, which is frequently carried out using gas (e.g. nitrogen, carbon dioxide, noble gases, water vapour). Examples of significant working volumes which can occur in the chemical industry and frequently require inertization are containers, tanks, reactors, pipes, compressor stages, pumps, separation columns for carrying out thermal separation processes, e.g. absorption columns or distillation columns.

The objective here is to alter safety-relevant parameters of a material or mixture of materials present in the working volume in order, for example, to prevent an explosive atmosphere in the working volume or prevent an undesirable change in the properties of the materials or mixtures of materials present or of the working volume itself (e.g. as a result of corrosion). For this purpose, for example, the concentration of a disadvantageous or hazardous gas, often oxygen, is brought below a limit concentration below which the harmful or hazardous effect no longer occurs. This can, for example, be effected by binding the oxygen to a sorbent which is selective for oxygen, but partial or complete displacement of the oxygen by introducing a gas which is unreactive in respect of the undesirable chemical reaction (inert gas) into the working volume is more widespread. The introduction can occur continuously or intermittently as a function of a measured oxygen concentration in the working volume. It is also possible to carry out occasional treatment with inert gas in the case of particular operating states or operational changes of a chemical production plant or in the case of plant downtimes during maintenance or repair work, in which plant parts have previously been exposed to ambient air, in order to allow entry of repair personnel into this region. A corresponding inertization apparatus with safety device is described by the European patent application EP 1 913 980 A1.

In the case of blanketing with inert gas, the gas space above the stored product in tanks or in reactors is filled with an inert gas in order to protect the contents against explosion, to prevent oxygen-related degradation processes or polymerization reactions or protect items against corrosion. A blanketing system is usually designed so that it can operate under pressures higher than atmospheric pressure and thus prevents the intrusion of ambient air into vessels.

For economic reasons and because of its availability, nitrogen is the most frequently used inert gas. Many production plants of the chemical, in particular petrochemical, industry or refineries are equipped with a plant-wide or site-wide inert gas distribution system which comprises pipes for distributing the inert gas and inert gas offtake points which can be connected by means of a connecting conduit to the working volume to be incited. These connecting conduits are usually made flexibly in order to be able to establish a simple connection between the working volume and the inert gas distribution system and are connected to the inert gas distribution system via a pressure reducer or a simple offtake valve by means of which the inert gas volume flow can be set. Furthermore, a nonreturn valve can be present in order to prevent flow of foreign gas back into the inert gas distribution system; which would otherwise lead to contamination.

The use, for example, of polymer hoses, e.g. rubber hoses, as connecting conduit is widespread. A disadvantage here is, however, that the ability of such hoses to withstand pressure is greatly limited, for example to a maximum of 10 bar. These hoses can therefore burst relatively quickly when used wrongly, as a result of which combustible or toxic process media can be released from the working volume to be inerted.

Thanks to the increasing automation of production plants of the chemical industry, there are ever fewer operating personnel. The operating time between operational resettings (known as turnarounds) or the maintenance of machines or other equipment is becoming ever longer. The consequence thereof is that the remaining, numerically restricted personnel have to do more work during operational resetting or machine maintenance and at the same time have less experience since such particular plant states occur less frequently. This can lead to incorrect operation during inerting and result in dangerous situations. This is increased by the fact that the inerting of working volumes, for example by flushing with nitrogen as inert gas, is often carried out using conduits which are not equipped with a shutoff or nonreturn valve, as a result of which incorrect operation and undesirable overfilling of vessels or backflow of contamination into the inert gas distribution system can occur.

The connecting conduit used for inerting has to be separated from the inerted working volume before (re)starting of a production plant. It is possible that this is forgotten for the abovementioned reason. Thus, when the connecting conduit, for example a polymer hose, remains connected to the working volume present in the production plant, the design pressure of the conduit could be exceeded during restarting and thus bursting of the conduit could occur, as a result of which hazardous operating media could be released into the surroundings. This problem is increased further by the fact that the process gases flowing into the conduit often have high temperatures, while the use of flexible polymer hoses is permissible only for gases which are at ambient temperature.

On the other hand, if the pressure in the working volume is not high enough to bring about this bursting, contamination of the inert gas inventory in the inert gas distribution system could still occur as a result of backflow, which is likewise undesirable.

SUMMARY

It is therefore the object of the present invention to provide an inertization apparatus for inerting a working volume in a chemical production plant by flushing with inert gas, which does not have the abovementioned disadvantages of the prior art.

This object is achieved in a first aspect by an inertization apparatus having the features of claim 1. Further embodiments of the invention are evident from the dependent claims. The invention further provides for particular uses of such an inertization apparatus.

For the purposes of the present invention, a working volume, in particular a working volume in a chemical production plant, is a space which is or can be delimited by walls, has a volume and can be closed in respect of entering or exiting streams of material and which serves, for example, for carrying out chemical reactions, thermal separation operations, transport or storage of materials. Examples of such working volumes in a chemical production plant are vessels, tanks, reactors, pipes, compressors, individual compressor stages, pumps, distillation columns, absorption columns.

For the purposes of the present invention, a fluid connection between two regions of the apparatus of the invention is any type of connection which makes it possible for a fluid, for example a gas stream, to be able to flow from the one region to the other of the two regions, regardless of any interposed regions or components located in between. In particular, a direct fluid connection is any type of connection which makes it possible for a fluid, for example a gas stream, to be able to flow directly from the one region to the other of the two regions, with no further regions or components being located in between. An example would be a pipe or hose conduit leading directly from the one region to the other of the two regions.

For the purposes of the present invention, a means is something which enables or is helpful in achieving an objective. In particular, means for carrying out a particular process step are all physical objects which a person skilled in the art would take into consideration in order to be able to carry out this process step. For example, a person skilled in the art will consider means of introducing or discharging a material stream to include any transporting and conveying apparatuses, i.e. for example pipes, pumps, compressors, valves, which seem necessary or sensible to said skilled person for performance of this process step on the basis of such a person's knowledge of the art.

For the purposes of the present invention, a connecting device is a two-part physical article which consists of one piece and a counterpiece which can be connected thereto and serves to establish a direct fluid connection between two regions. When the connecting device has such a construction that exit of gases from the connecting device into the surroundings or inflow of gases from the surroundings into the connecting device is prevented, it is referred to as a gastight connection. The surroundings can be, for example, the surrounding atmosphere.

For the purposes of the present invention, the statement that two bodies, for example the constituents of a connecting device, can be connected in a reversibly detachable manner means that these can be separated in a purely mechanical manner and without destruction, i.e. without overcoming chemical binding forces, and be reconnected in a purely mechanical manner. For this reason, positive locking methods and frictional joining methods, in particular, are encompassed by this type of connection. Positively locked connections are established by the shaping of the bodies to be connected. Frictional connections are held together by frictional forces. As examples of reversibly detachable connections, mention may be made of plugging-in, screw connections, clamping and rivet connections since although the rivets have to be destroyed for separation, the connected components do not have to be.

In contrast thereto, the statement that two bodies, for example the constituents of a connecting device, cannot be connected in a reversibly detachable manner means that chemical bonding forces have to be overcome to release the connection, resulting in some destruction of at least the connecting material. Such connections are also referred to as substance-to-substance bonds which produce a connection in the material itself. These include welded and soldered joints and also adhesive bonds. A characteristic here is that when a connection between the previously separated bodies is re-established, it is necessary to re-apply an auxiliary, for example welding means, solder or adhesive.

The statement that two bodies, for example the constituents of a connecting device, interlock in a mechanically complementary way means that the two bodies are configured in terms of their shape so that they can be connected and also separated again by plugging into one another and opposed turning. Examples are key and lock or a bayonet connection.

A nonreturn valve is a mechanical component which permits flow of a fluid, i.e. of a liquid or a gas, in only one direction. In the case of spring-loaded nonreturn valves, the closing element is closed in one direction by the spring, but in the other direction is open by the pressure of the flowing fluid. Here, either a ball, a cone, a flap or a membrane is pressed into the respective seat of the seal. If a pressure which can overcome the restoring force of the spring is applied in the throughput direction, the sealing element is lifted from the seat and the opening is free. In the case of nonreturn valves without a spring, the sealing element is pressed into the seat of the seal either by gravity or by the flow pressure of the flowing fluid.

For the purposes of the present invention, an offgas disposal apparatus is an apparatus which operates according to a principal of offgas after-treatment or offgas purification. The offgas disposal apparatus also comprises means for discharging the offgases from the place at which they arise and feeding them to the offgas after-treatment or offgas purification, for example pipes. Combustion, for example in a flare system, is often a suitable disposal method for flammable offgases. In the case of types of offgas which are of lesser concern, release into the environment, for example via a stack, can also be a suitable method of disposal, as long as the legal emission limits are adhered to.

The present invention is based on the concept that the second connecting conduit, i.e. the connecting conduit between the inertization apparatus and the working volume to be inerted, is connected at its end nearest the working volume to an intermediate piece, preferably connected in a not reversibly detachable manner to an intermediate piece, where the intermediate piece can be connected in a reversibly detachable manner to a counterpiece provided on the working volume. The preferably not reversibly detachable connection between the connecting conduit and intermediate piece prevents the intermediate piece from being able to be removed in a simple manner from the connecting conduit and the connecting conduit being able to be used for incorrect purposes. The connection between the working volume and the intermediate piece, on the other hand, is configured so as to be reversibly detachable so that a connection between working volume and intermediate piece can be established in a simple manner, optionally even without use of particular tools, and can be released again after inerting has been effected. It is advantageous here for intermediate piece and counterpiece to engage with one another in a mechanically complementary manner and thus to form a connecting device in the connected state. It is further advantageous for intermediate piece and counterpiece to engage with one another in a mechanically complementary manner and thus to form a connecting device in the connected state, with only the formation of the connecting device allowing the flow of inert gas into the working volume. In other words, no flow of inert gas is possible in this configuration when intermediate piece and counterpiece are separated.

Furthermore, it is advantageous for the intermediate piece and/or the connecting conduit to have a backflow prevention device between the inertization apparatus and the working volume to be inerted. This prevents operating media from being able to flow into the inertization apparatus if the working volume has unintentionally been left connected to the inertization apparatus during operation of the working volume, for example because its disconnection has been forgotten.

A second aspect of the apparatus of the invention is characterized in that the fourth connecting device, in particular the intermediate piece, is configured so that inflow of inert gas into the working volume is made possible only in the connected state. This could, for example, be effected by the intermediate piece being equipped with a spring-loaded shutoff flap which in the detached state of the intermediate piece blocks the gas path through the conduit connected to the intermediate piece. A mandril can be installed on the counterpiece connected to the working volume in such a way that on establishment of the connection between intermediate piece and counterpiece the mandril pushes the shutoff flap inwards and thus opens the gas path. This avoids the escape of inerting gas in the disconnected state and further reduces the possibility of incorrect use of the inertization apparatus. Furthermore, this prevents building up of an overpressure in the second connecting conduit due to backflow of operating media into the second connecting conduit, which overpressure, on detachment of the connection between intermediate piece and counterpiece is lowered suddenly and leads to uncontrolled, whip-like movements of the second connecting conduit, which could lead to injury to operating personnel.

A third aspect of the apparatus of the invention is characterized in that the second connecting conduit is mechanically flexible, in particular bendable. This assists the establishment of the connection between inertization apparatus and working volume under different local circumstances and in different positions since the space available for installation of the inertization apparatus in chemical plants is often very limited. The material properties and mechanical properties of the mechanically flexible, in particular bendable, second connecting conduit should preferably be selected so that it is compatible with the inert gas and the pressure and temperature thereof. To ensure the greatest possible operational safety, stability of the second connecting conduit against the type and, within sensible limits, against pressure and temperature of the operating medium should preferably also be ensured in the event of unintentional backflow of operating medium from the working volume into the second connecting conduit.

A fourth aspect of the apparatus of the invention is characterized in that the second connecting conduit is configured as polymer hose, metal-fabric-reinforced polymer hose or metal tube. These materials are readily obtainable commercially. Metal-fabric-reinforced polymer hoses or metal tubes can also withstand a higher pressure than pure polymer hoses or polymer hoses with textile reinforcement, mineral fibre reinforcement or polymer fabric reinforcement.

A fifth aspect of the apparatus of the invention is characterized in that intermediate piece and counterpiece engage with one another in a mechanically complementary manner and in the connected state thus form the fourth connecting device, with intermediate piece and counterpiece having a configuration selected from the following group:
key and lock, bayonet connection, external and internal thread as left-hand thread,
where the intermediate piece and counterpiece are configured so that they can be connected in a gastight manner by bringing together and turning. This further reduces the possibility of incorrect use of the inertization apparatus.

A sixth aspect of the apparatus of the invention is characterized in that the backflow prevention device is configured as nonreturn valve. Nonreturn valves are commercially available in many configurations, so that a nonreturn valve suitable for use in the apparatus of the invention can easily be found. Examples are nonreturn flaps or check valves.

A seventh aspect of the apparatus of the invention is characterized in that the backflow prevention device is configured so that it withstands the gas atmosphere in the working volume at the maximum pressure and maximum temperature thereof for a predetermined maximum time. In this way, damage to or destruction of the inertization apparatus and exit of operating media into the surroundings is prevented if the working volume is unintentionally still connected to the inertization apparatus on commencement of operation of the working volume, for example because its disconnection has been forgotten. The predetermined maximum time should be guided by the practical circumstances of the working volume. A person skilled in the art can determine it by appropriate routine tests.

An eighth aspect of the apparatus of the invention is characterized in that the second connecting conduit and/or the fourth connecting device comprises an overpressure release device having a discharge conduit, with the discharge conduit being suitable for gastight connection of the overpressure release device to the offgas disposal apparatus. As soon as the overpressure release device is actuated in the case of overpressure, the appropriate gas path into the offgas disposal apparatus, for example a flare system, is opened so that, for example, operating media unintentionally entering the inertization apparatus can be discharged safely from the working volume and be disposed of. This prevents further build-up of an overpressure in the second connecting conduit, which could otherwise lead to bursting of the latter.

A ninth aspect of the apparatus of the invention is characterized in that the overpressure release device comprises at least one element selected from the following group: bursting disk, mechanical overpressure valve; pneumatically or electromagnetically actuated valve controlled by a pressure sensor which transmits an electronic control signal to the valve as a function of the measured pressure value. Suitable overpressure release devices are commercially available in many configurations, so that an overpressure release device suitable for use in the apparatus of the invention can easily be found. The pressure sensor is preferably equipped with a local pressure indicator so that the operating personnel can see whether the second connecting conduit is under superatmospheric pressure before release of the connection between second connecting conduit and working volume. Furthermore, preference is given to the pressure value measured by means of the pressure sensor activating an alarm in the process control system when the measured pressure value is greater than the pressure of the inert gas in the inert gas distribution system and the second connecting conduit is still connected to the working volume. This alarm can preferably be used for preventing start-up of the working volume as long as both alarm criteria are satisfied.

A tenth aspect of the apparatus of the invention is characterized in that the first connecting conduit and/or the first connecting device comprises a backflow prevention device. This backflow prevention device, too, can be configured as nonreturn valve. In this way, unintentional intrusion of operating media from the working volume into the inert gas distribution system can be additionally prevented.

An eleventh aspect of the apparatus of the invention is characterized in that the third connecting conduit and/or the third connecting device has an overpressure release device. In this way, any backflow of gas from the working volume can be reliably diverted into the offgas disposal apparatus.

A particular aspect of the invention provides for the use of an inertization apparatus according to any of claims 1 to 11 for inerting a working volume in a chemical production plant, where the chemical production plant is selected from the group: refinery plant, petrochemical plant, synthesis gas production plant, air fractionation plant. Numerous working volumes which contain flammable, fire-promoting, explosive, toxic operating media occur in the production plants mentioned.

A further particular aspect of the invention provides for the use of an inertization apparatus according to any of claims 1 to 11 for inerting a working volume in a chemical production plant, where the working volume is selected from the group: vessels, tanks, reactors, pipes, compressors; individual compressor stages, pumps, distillation columns, absorption columns. During changes in the mode of operation and also during start-up and shutdown of chemical production plants, it is often necessary to make the abovementioned working volumes inert and thus bring them into a safe state.

A further particular aspect of the invention provides for the use of an inertization apparatus according to any of claims 1 to 11 for inerting a working volume in a chemical production plant, wherein at least one inert gas selected from the group: Nitrogen, argon, carbon dioxide, oxygen-depleted air, mixtures of at least two of the abovementioned gases is used. Nitrogen in particular is frequently preferred as inert gas because of its good availability and low reactivity.

BRIEF DESCRIPTION OF THE DRAWINGS

Further developments, advantages and possible uses of the invention are also evident from the following description of a working example and the drawing. All features described and/or depicted form, either in themselves or in any combination, the invention, regardless of the way they are combined in the claims or the back-references therein. The single FIGURE shows:

FIG. 1 illustrates a working example of an inertization apparatus according to the invention.

DETAILED DESCRIPTION OF PREFERRED EMBODIMENTS

In the working example of an inertization apparatus according to the invention as shown in FIG. 1, nitrogen is provided as inerting gas in a chemical production plant via a conduit 10, which represents part of the plant-wide inert gas distribution system. Conduit 10 is connected to an inert gas offtake position which comprises a conduit 12 and a valve arranged in the conduction path 12. A gas distributor 20 is connected in a gastight manner to the inert gas offtake position of the inert gas distribution system via a first connecting device 14, a first connecting conduit 16, a valve arranged in the conduction path 16 and a connecting device 18.

The gas distributor 20 does not require any particular configuration; it is possible to use a connecting piece which is commercially available or can easily be produced, for example a pipe-connection T-piece or cross-piece. In the latter case, an additional gas path is available. On the other hand, a configuration of the gas distributor as vessel having the appropriate connection facilities for connecting conduits has the advantage that pressure fluctuations or pressure pulses in the connecting conduits are damped to a greater extent because of the higher intrinsic volume compared to pure pipe connections.

The gas distributor 20 is connected via the second connecting device 22, the second connecting conduit 24 and a valve arranged in the conduction path 24 to a backflow prevention device 26 which in the present example is configured as nonreturn flap and opens only the gas path away from the gas distributor while shutting the gas path in the direction towards the gas distributor.

The backflow prevention device is connected via a further conduit 28 to an intermediate piece 30 which is connected by positive locking and frictionally to a counterpiece 32. This is indicated in FIG. 1 by intermediate piece and counterpiece each being depicted in respect of the process symbol used as part of a valve, with the two fitting together because of their shape, as indicated by the symbol «. For example, intermediate piece and counterpiece can be configured as corresponding parts of a bayonet connection which accordingly engage with one another in a mechanically complementary manner and can be connected in a reversibly detachable manner by bringing together and turning. Intermediate piece and counterpiece then form a fourth connecting device.

The counterpiece 32 is connected in a gastight manner to a working volume, in the present case a vessel 50 to be inerted. The vessel 50 is connected via the connecting device 54, conduit 52 and a valve arranged in the conduction path 52 to a feed conduit and via connecting device 56, conduit 58 and a valve arranged in the conduction path 58 to a discharge conduit for an operating medium. During inertization operation, nitrogen as inerting gas flows via the fourth connecting device into the vessel 50. The resulting flushing gas is discharged from the vessel 50 via conduit 58 and fed to an offgas disposal apparatus which is not shown. The conduction path 52 is closed (indicated by the solid black valve symbol) during inertization by closing of the appropriate valve.

The gas distributor 20 is also connected in a gastight manner via a third connecting device 40, a third connecting conduit 42 and a spring-loaded safety valve 44 arranged in the conduction path 42 to an offgas disposal apparatus which is not shown. If separating the connection between the gas distributor and the working volume by detaching the connection between intermediate piece and counterpiece is forgotten before renewed start-up of the working volume after inerting is completed, it is possible for operating media to be able to flow into the inertization apparatus if the backflow prevention device effects only in sufficient closure in the backflow direction, for instance because it has been made to leak by hot operating medium and thus only insufficiently performs its task. In this case, the gas path via the third connecting conduit 42 into the offgas disposal apparatus is open by appropriate setting of the safety valve 44 and thus safely disposes of the operating medium which enters the inertization apparatus. In this case, it is advantageous also to close the gas path via the first connecting conduit by means of a backflow prevention device which is additionally installed in this connecting conduit but is not pictorially shown in order to prevent backflow of the operating medium into the conduit 10 and thus prevent contamination of the inerting gas.

Further advantageous embodiments of the inertization apparatus of the invention which are not pictorially shown in FIG. 1 are explained below. They can be combined with the above working example as shown in FIG. 1 and also with one another, unless a person skilled in the art excludes particular combinations as not useful or not possible.

A further advantageous embodiment of the inertization apparatus of the invention, which is not pictorially shown in FIG. 1, provides for the fourth connecting device, in particular the intermediate piece, to be configured so that inflow of inert gas into the working volume is made possible only in the connected state. This could, for example, be affected by the intermediate piece being equipped with a spring-loaded shutoff flap which in the disassembled state of the intermediate piece closes the gas path through the conduit connected to the intermediate piece. A mandril could then be installed on the counterpiece connected to the working volume so as to press the shutoff flap inward and thus open the gas path on establishment of the connection between intermediate piece and counterpiece. This avoids escape of inerting gas in the disconnected state and further reduces the possibility of incorrect use of the inertization apparatus.

A further advantageous embodiment of the inertization apparatus of the invention, which is not pictorially shown in FIG. 1, provides for the second connecting conduit to be mechanically flexible, in particular bendable. This assists establishment of the connection between inertization apparatus and working volume under different local circumstances and in different positions since the space for installing the inertization apparatus in chemical plants is often very limited.

A further advantageous embodiment of the inertization apparatus of the invention, which is not pictorially shown in FIG. 1, provides for the second connecting conduit to be configured as polymer hose, metal-fabric-reinforced polymer hose or as metal tube. These materials are readily obtainable commercially. Metal-fabric-reinforced polymer hoses or metal tubes can also be subjected to a higher pressure than pure polymer hoses or those having textile, mineral fibre or polymer fabric reinforcement.

A further advantageous embodiment of the inertization apparatus of the invention, which is not shown pictorially in FIG. 1, provides for the intermediate piece and counterpiece to have a configuration which is selected from the following group:
  key and lock, bayonet connection, external and internal thread as left-hand thread,
  where intermediate piece and counterpiece are configured so that they can be connected in a gastight manner by bringing together and turning and wherein the intermediate piece comprises a closure device for the inflowing inert gas, which is opened on turning and thus opens the inert gas path. This avoids the escape of inerting gas in the disconnected state and further reduces the possibility of incorrect use of the inertization apparatus.

A further advantageous embodiment of the inertization apparatus of the invention, which is not shown pictorially in FIG. 1, provides for the backflow prevention device to be configured as nonreturn valve. Nonreturn valves are commercially available in many embodiments, so that a nonreturn valve suitable for use in the apparatus of the invention can easily be found. Examples are nonreturn flaps or check valves.

A further advantageous embodiment of the inertization apparatus of the invention, which is not pictorially shown in FIG. 1, provides for the backflow prevention device and/or the closure device to be configured so that they withstand the gas atmosphere in the working volume at the maximum pressure and maximum temperature thereof for a predetermined maximum time. In this way, damage to or destruction of the inertization apparatus and exit of operating media into the surroundings are prevented if the working volume is unintentionally still connected to the inertization apparatus on start-up of the working volume, for example because its disconnection has been forgotten. The predetermined maximum time should be guided by the practical circumstances of the working volume. A person skilled in the art can determine it by means of appropriate routine tests.

A further advantageous embodiment of the inertization apparatus of the invention, which is not pictorially shown in FIG. 1, provides for the second connecting conduit and/or the fourth connecting apparatus to comprise an overpressure release device having a discharge conduit, with the discharge conduit being suitable for connecting the overpressure release device in a gastight manner to the offgas disposal apparatus. As soon as the overpressure release device is actuated in the event of overpressure, the appropriate gas path into the offgas disposal apparatus, for example a flare system, is opened so that, for example, operating media unintentionally intruding into the inertization apparatus can be safely discharged from the working volume and be disposed of. This prevents the further build-up of an overpressure in the second connecting conduit, which could otherwise lead to bursting of the latter.

A further advantageous embodiment of the inertization apparatus of the invention, which is not pictorially shown in FIG. 1, provides for the overpressure release device to comprise at least one element selected from the following group: bursting disk, mechanical overpressure valve: pneumatically or electromagnetically actuated valve controlled by a pressure sensor which transmits an electronic control signal to the valve as a function of the measured pressure value. Suitable overpressure release devices are commercially available in many configurations, so that an overpressure release device suitable for use in the apparatus of the invention can easily be found.

A further advantageous embodiment of the inertization apparatus of the invention, which is not pictorially shown in FIG. 1, provides for the first connecting conduit and/or the first connecting device to comprise a backflow prevention device. This backflow prevention device can also be configured as nonreturn valve. In this way, unintended intrusion of operating media from the working volume into the inert gas distribution system can additionally be prevented.

LIST OF REFERENCE NUMERALS

10 Conduit
12 Conduit with valve
14 Connecting device (first connecting device)
16 Conduit (first connecting conduit) with valve
18 Connecting device
20 Gas distributor
22 Connecting device (second connecting device)
24 Conduit (second connecting conduit) with valve 26 Backflow prevention device
28 Conduit
30 Intermediate piece
32 Counterpiece
40 Connecting device (third connecting device)
42 Conduit (third connecting conduit)
44 Safety valve
50 Vessel (working volume)
52 Conduit with valve
54 Connecting device
56 Connecting device
58 Conduit with valve

What is claimed is:

1. An apparatus for inerting a working volume in a chemical production plant by flushing with inert gas, wherein the chemical production plant comprises a plant-wide inert gas distribution system comprising pipes for distributing the inert gas and at least one inert gas offtake position which can be connected to a connecting conduit, the apparatus comprising the following constituents and assemblies having a fluid connection with one another:
   (a) a gas distributor and a first connecting conduit having a first connecting device, configured to establish a gastight connection between the at least one inert gas offtake position and the gas distributor,
   (b) a second connecting conduit having a second connecting device, configured to connect the gas distributor to the working volume to be inerted,
   (c) a third connecting conduit having a third connecting device, configured to connect the gas distributor to an offgas disposal apparatus,
   wherein the second connecting conduit is connected at the end closest to the working volume to an intermediate piece, wherein the intermediate piece may be connected in a reversibly detachable manner to a counterpiece provided on the working volume, wherein the intermediate piece and the counterpiece in the connected state form a fourth connecting device thereby allowing a flow of inert gas into the working volume, and wherein the second connecting conduit and/or fourth connecting device comprises a backflow prevention device.

2. The apparatus according to claim 1, wherein the fourth connecting device is configured so that inflow of inert gas into the working volume may occur only in the connected state.

3. The apparatus according to claim 1, wherein the second connecting conduit is mechanically flexible.

4. The apparatus according to claim 3, wherein the second connecting conduit is configured as polymer hose, metal-fabric-reinforced polymer hose or as metal tube.

5. The apparatus according to claim 1, wherein the intermediate piece and the counterpiece engage with one another in a mechanically complementary manner and in the connected state thus form the fourth connecting device, with the intermediate piece and the counterpiece having a configuration selected from the following group:
   key and lock, bayonet connection, external and internal thread as left-hand thread, where intermediate piece and counterpiece are configured to be connected in a gastight manner by bringing together and turning.

6. The apparatus according to claim 1, wherein the backflow prevention device is configured as nonreturn valve.

7. The apparatus according to claim 1, wherein the backflow prevention device is configured to withstand the gas atmosphere in the working volume at the maximum pressure and maximum temperature thereof for a predetermined maximum time.

8. The apparatus according to claim 1, wherein the second connecting conduit and/or the fourth connecting device comprises an overpressure release device having a discharge conduit, wherein the discharge conduit is suitable for gastight connection of the overpressure release device to the offgas disposal apparatus.

9. The apparatus according to claim 8, wherein the overpressure release device comprises at least one element selected from the group consisting of: bursting disk, mechanical overpressure valve; and pneumatically or electromagnetically actuated valve controlled by a pressure sensor which transmits an electronic control signal to the valve as a function of the measured pressure value.

10. The apparatus according to claim 1, wherein the first connecting conduit and/or the first connecting device comprises a backflow prevention device.

11. The apparatus according to claim 1, wherein the third connecting conduit and/or the third connecting device comprises an overpressure release device.

* * * * *